US007657235B2

(12) United States Patent
Wessels et al.

(10) Patent No.: US 7,657,235 B2
(45) Date of Patent: Feb. 2, 2010

(54) COMMUNICATION NETWORK WITH ARRANGEMENT FOR REPLACING A MALFUNCTIONING ACTIVE MASTER WITH A NEW ACTIVE MASTER

(75) Inventors: Johannes Hendrik Wessels, Eindhoven (NL); Marcel Beij, Eindhoven (NL); Ling Wang, Chicago, IL (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 494 days.

(21) Appl. No.: 10/567,836

(22) PCT Filed: Aug. 3, 2004

(86) PCT No.: PCT/IB2004/051374

§ 371 (c)(1),
(2), (4) Date: Feb. 8, 2006

(87) PCT Pub. No.: WO2005/018160

PCT Pub. Date: Feb. 24, 2005

(65) Prior Publication Data

US 2006/0203714 A1  Sep. 14, 2006

(30) Foreign Application Priority Data

Aug. 13, 2003  (EP) .................................. 03102516

(51) Int. Cl.
*H04B 1/40* (2006.01)
(52) U.S. Cl. ...................................................... 455/88
(58) Field of Classification Search ................. 370/216, 370/217, 218, 219, 220, 221, 222, 223, 224, 370/225, 226, 227, 228
See application file for complete search history.

(56) References Cited

U.S. PATENT DOCUMENTS

| 4,697,187 | A | * | 9/1987 | Ohno et al. ................. 342/358 |
| 5,146,215 | A | * | 9/1992 | Drori ......................... 340/5.22 |
| 5,463,286 | A | | 10/1995 | D'Aleo et al. |
| 5,583,796 | A | * | 12/1996 | Reese ......................... 702/185 |
| 5,623,532 | A | | 4/1997 | Houde et al. |
| 5,815,297 | A | * | 9/1998 | Ciciora ....................... 398/112 |
| 5,905,442 | A | | 5/1999 | Mosebrook et al. |
| 7,103,511 | B2 | * | 9/2006 | Petite ......................... 702/188 |

(Continued)

FOREIGN PATENT DOCUMENTS

DE  19705985 A1  7/1998

(Continued)

*Primary Examiner*—Chi H Pham
*Assistant Examiner*—Fan Ng

(57) ABSTRACT

A communication network includes a plurality of devices and a control unit for generating control signals to control the operation of the devices. Each device includes: a device operating circuit, a communication interface for receiving command signals for controlling operation of the devices, a control circuit coupled between the device operating circuit and the communication interface for controlling the operation of the device operating circuit part in dependency of said command signals, and a master integral to the device for receiving the control signals, for generating the command signals in response to the received control signals, and for transferring the command signals to the communication interfaces of the plurality of devices. The communication network activates one of the masters as an active master, and in case the active master fails, then it activates another master to take over as the active master.

19 Claims, 1 Drawing Sheet

U.S. PATENT DOCUMENTS

Figure 1:
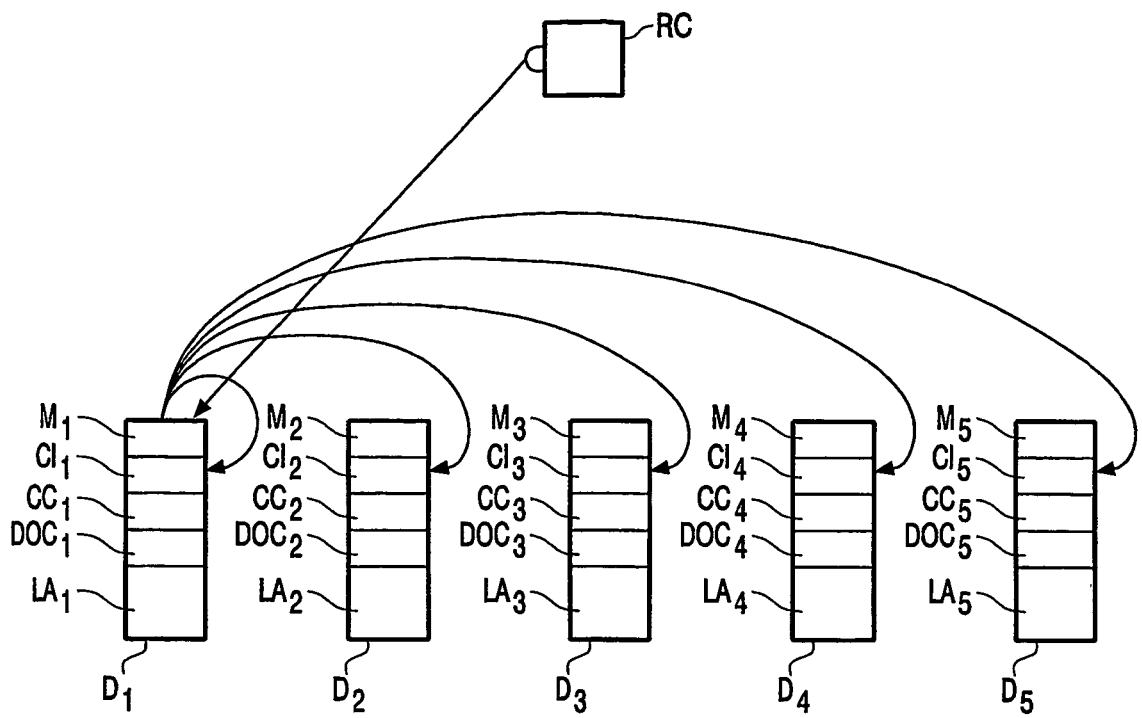

| | | | |
|---|---|---|---|
| 2001/0020831 A1* | 9/2001 | Van Der Veen et al. | 315/209 R |
| 2002/0061024 A1* | 5/2002 | Malkemes et al. | 370/401 |
| 2002/0184387 A1* | 12/2002 | Yamaya et al. | 709/238 |
| 2003/0124979 A1* | 7/2003 | Tanada et al. | 455/41 |
| 2004/0219880 A1* | 11/2004 | Edmonson et al. | 455/41.1 |
| 2004/0258067 A1* | 12/2004 | Irish et al. | 370/392 |

FOREIGN PATENT DOCUMENTS

| | | |
|---|---|---|
| DE | 19950135 A1 | 4/2001 |
| EP | 0534710 A1 | 3/1993 |
| EP | 0534710 B1 | 3/1993 |
| EP | 1176762 A1 | 1/2002 |
| EP | 1176762 B1 | 1/2002 |
| JP | 05176379 A | 7/1993 |
| WO | 9419744 A1 | 9/1994 |
| WO | 0124587 A1 | 4/2001 |

* cited by examiner

COMMUNICATION NETWORK WITH ARRANGEMENT FOR REPLACING A MALFUNCTIONING ACTIVE MASTER WITH A NEW ACTIVE MASTER

The invention relates to a communication network comprising
a plurality of devices, each equipped with
a device operating circuit,
a communication interface for receiving command signals,
a control circuit coupled between the device operating circuit and the communication interface for controlling the operation of the device operating circuit in dependency of said command signals,
a control unit for generating control signals to control the operation of the devices,
a master for receiving the control signals and for generating command signals and transferring the command signals to the communication interfaces of the devices.

The invention also relates to a method for operating such a communication network.

Such a communication system is generally known. A user of such a communication system can for instance adjust the operating state of the device operating circuits. For instance, in case part of the devices is equipped with a lamp and the device operating circuit comprises a ballast circuit for operating a lamp, the user can adjust the light output of the lamps operated by said part of the devices making use of the control unit The control unit can for instance be implemented as a wireless remote control unit. The control signals generated by the control unit are received by the master and the master in turn generates command signals comprising addresses of the devices. These command signals are transmitted by the master and are received by all the communication interfaces of the devices comprised in the communication system. When the communication interface finds that the address comprised in the command signal matches the address of the device that it is part of, it activates the control circuit and the control circuit controls the operation of the device operating circuit in such a way that the operation is adjusted as desired by the user. In the known system the master functions as an intermediaire between the control unit and the devices. This means that, in case of a failure of the master, communication between the control unit and the devices is impossible, so that a user can no longer control the operation of the devices.

The invention aims to provide a communication system in which a master effectively controls the communication between the control unit and the devices and in which the communication between the control unit and the devices is immediately and automatically restored in case of a failure of the master.

A communication system as described in the opening paragraph is therefor in accordance with the invention characterized in that each device is equipped with a master and the communication system comprises activating means for activating one of the masters and for activating another master in case the active master fails.

When a communication system according to the invention is switched on, one of the masters comprised in the communication system will be activated by the activating means and will actually function as master. The other masters remain unactivated. In case the active master fails, another, second master is activated by the activating means so that the communication between the control unit and the devices is restored. In case the second master fails as well, the activating means will activate a third master etcetera. As a consequence the communication between control unit and devices in a communication system according to the invention is effectively and plurally protected against master failure.

The masters need not all be separate units but each master is preferably comprised in a device so that all the devices are identical. This simplifies the installation of the communication system and also offers logistic advantages.

In a communication network according to the present invention the control unit preferably is a wireless remote control unit and each master is preferably equipped with a transceiver for wireless communication between the control unit and the master and between the master and the communication interfaces of the devices.

Good results have been obtained for a communication network according to the invention, wherein, in a group formed by at least a part of the devices but preferably all the devices, the device operating circuit comprises a ballast circuit for operating a lamp. Preferably each device in the group is comprised in a luminaire.

In a first preferred embodiment of a communication network according to the invention, each master is equipped with beacon means for transmitting periodical signals when it is active and with detecting means for detecting the periodical signals transmitted by an active master. In this first preferred embodiment, the active master informs all the other masters that it is active by transmitting periodical signals. By detecting the periodical signal, every unactive master is able to detect if there is still an active master. As long as there is an active master, all the unactive masters remain unactive. In case the active master fails, the beacon means no longer transmits the periodical signals. Because they no longer detect the periodical signals all the other masters are informed about the failure of the active master. The detecting means preferably comprise a timer circuit for timing the time lapse during which the periodical signal is absent. In this first preferred embodiment, the detecting means form part of the activating means.

After the unactive masters have detected the failure of the active masters, the activating means activates one of them so that this one becomes the active master. It is possible to rank the masters by giving each of them a number and activating the master with the next higher number when the active master fails. However, in that case the communication network would have to be equipped with means for finding out which master has the next higher number. A simpler solution to the problem is to realize the activating means by equipping each of the masters comprised in the network with means for activating itself in case failure of the active master is detected by its detecting means. In practise, one of the so far unactive masters will be the first master that becomes active. As soon as this master has become active, its beacon means starts transmitting periodical signals that are detected by the detecting means of the other masters. The detection of the periodical signals transmitted by the master that first became active prevents the other masters from becoming active. In this simpler solution it is not necessary to rank the masters and it is also not necessary to provide means for finding out which master has the next higher number in case the active master fails.

The means for activating itself preferably become active when the time lapse during which the periodical signal is absent is longer than a predetermined time lapse.

An embodiment of the invention will be explained making reference to a drawing.

Figure 2:
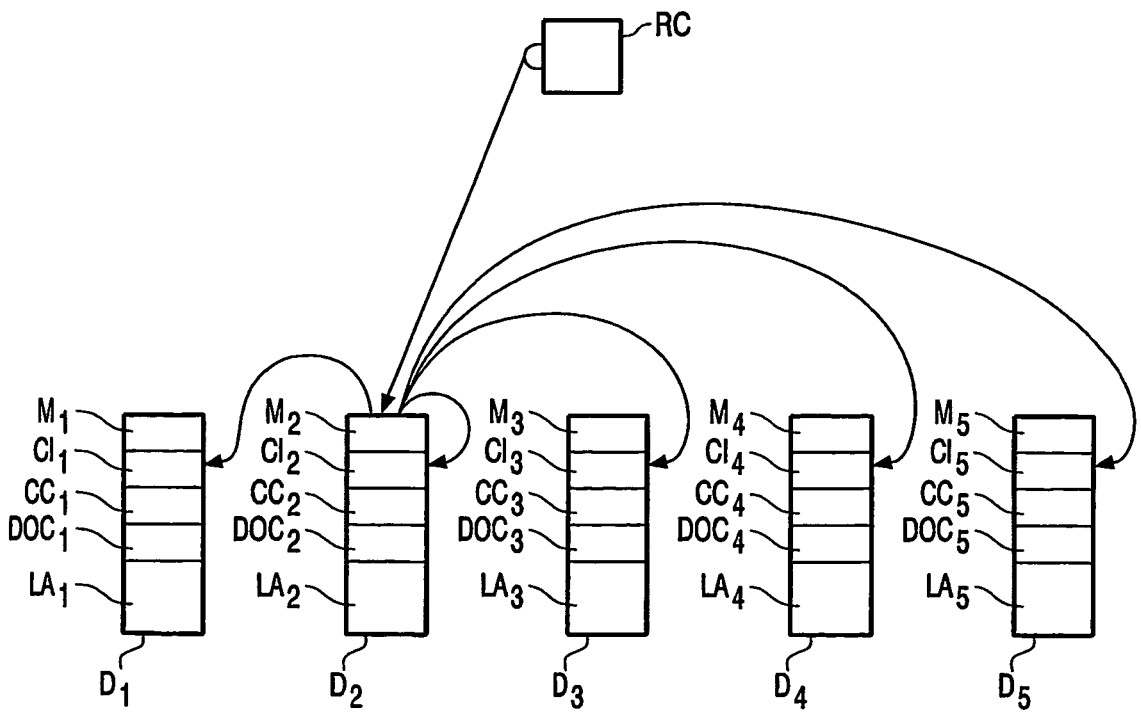

In the drawing,

FIG. 1 schematically shows an embodiment of a communication system according to the invention and the routing of the communication in the communication system when a first master is the active master, and FIG. 2 shows the same embodiment of a communication system according to the invention and the routing of the communication after the active master has failed and a second master has become the active master.

In FIG. 1, RC is a remote control functioning as a control unit in this embodiment. D1-D5 are devices. Each of the devices is equipped with a master M, a communication interface CI, a control circuit CC, a device operating circuit DOC that in this embodiment is formed by a ballast circuit and a lamp LA connected to the ballast circuit. Each master is equipped with a transceiver for wireless communication between the control unit and the master and between the master and the communication interfaces of the devices. Each master is also equipped with a beacon means for transmitting periodical signals when its active and with detecting means for detecting the periodical signals transmitted by an active master. The detecting means comprise a timer circuit for timing the time lapse during which the periodical signal is absent. Each of the masters further comprises means for activating itself in case the active master fails. Each master M or part of each master M may be realized by means of a microprocessor and a memory comprising software. In a concrete embodiment of the communication network shown in FIG. 1, the communication interface CI may comprise an antenna, a radio chip such as the CHIPCON EM2430, a demodulator and a modulator etc. The control circuit CC will generally comprise a decoder for decoding the signals from the communication interface CI and an interpreter supplying the proper signals to the device operating circuit DOC. The control circuit CC and the device operating circuit DOC may be realized by means of the same microprocessor as is comprised in the master M together with the proper software. The communication interface CI can communicate with the control circuit CC by means of for instance 12C, SPI or UART or any standard communication interface. The microprocessor can be an 8-bits type microprocessor, for instance the Philips 8051. The communication between the control circuit CC and the device operating circuit DOC can be by means of GPIO.

The functioning of the communication network shown in FIG. 1 is as follows. Immediately after switch on of the communication network, none of the masters is active, so that none of the beacon means transmits a periodical signal and none of the detecting means detects such a periodical signal. As a consequence the activating means of each of the masters is triggered. In practise, however, one of the masters becomes activated quicker than all the others. The beacon means of the activated master immediately starts to transmit a periodical signal, thereby preventing that one or more of the other masters are also activated. It is assumed that in the embodiment shown in FIG. 1, master M1 comprised in device D1 has become activated first and therefore is the active master. When a user for instance wants to dim all or part of the lamps LA1-LA5, the remote control is used to generate corresponding control signals. These signals are received by master M1. Each master comprises a memory containing a table that relates the control signals to commands and to the addresses of devices that should carry out such a command. Such a table can for instance be introduced into the memory of each master when the communication system is initialized and the binding between the remote control unit and the devices is realized. In response to the control signals master M1 generates command signals comprising commands and adresses of the devices that should carry out such a command and transmits these command signals. The command signals are received by all the communication interfaces including the communication interface comprised in device D1. Each of the communication interfaces interprets the received command signals to establish whether the command signal is meant for the device that it is part of by checking if its own address matches one of the adresses comprised in the command signals. When this is the case the communication interface activates the control circuit that it is coupled to. When activated the control circuit changes the operational state of the device operating circuit in such a way that the lamp connected to it is dimmed. Preferably the communication interface is equipped with means for transmitting an acknowledgement signal to the active master to confirm that the command signal has been received and the command has been carried out.

While master M1 is active, its beacon means transmits periodical signals that are detected by the detecting means comprised in masters M2-M5. In case of failure of master M1, master M1 no longer transmits the periodical signal. The timer circuits comprised in the masters M2-M5 start timing as soon as the periodical signal is no longer detected. When the timer circuits register that the periodical signal has been absent longer than a predetermined time lapse, in each master the means for activating itself are triggered. In practise one of the masters M2-M5 will become active first. In the embodiment shown in FIG. 2 it has been assumed that master M2 is the first master that becomes active after master M1 has failed. As can be seen in FIG. 2 the functioning of the communication network is now as follows. When a user for instance wants to dim all or part of the lamps LA1-LA5, the remote control is used to generate corresponding control signals. These signals are received by master M2. In response to the control signals master M2 generates command signals comprising commands and device addresses and transmits these command signals. The command signals are received by all the communication interfaces including the communication interface comprised in device D2. Each of the communication interfaces interprets the received command signals to establish whether the command signal is meant for the device that it is part (by checking whether the address of the device is in the command signal) and if so activates the control circuit that it is coupled to. When activated the control circuit changes the operational state of the device operating circuit in such a way that the lamp connected to it is dimmed.

In case master M2 fails, one of the masters M3-M5 will activate itself and become the active master. The communication network is thus effectively and plurally protected against master failure. It is noted that a master failure in practise will often be due the fact that the device that the master is part of has no supply voltage because of for instance a mains supply failure. It is further noted that generally speaking in a large communication network there will be more than one control unit, such as several remote controls.

In a communication system according to the invention each master is preferably an integral part of a device so that all the devices can be mutually identical. In case the devices are installed in a room that will later be split up in a number of smaller rooms, there is no need to take the later split up into account at the time the devices are installed. Since each device contains its own master, a communication system can function in each of the smaller rooms, since the presence of even only one device in that room ensures that there is also a master. As a consequence the invention allows a large number of possible divisions of a room in which a number of devices are placed. It is observed that such an advantageous flexibility does not exist for communication systems comprising only one master or a limited amount of masters.

In case a large number of devices is installed in a building, these devices are often supplied by means of a three-phase mains supply. Consequently, an approximately equal number of devices is supplied by each phase of the three phase mains supply. In case for instance only two devices comprise a master (one functioning as a main master and the other as a back up), care should be taken during installation of the devices that the two devices are supplied by different phases of the three phase power supply. This is necessary to ensure that the back up master can take over in case the phase that the main master is connected to is absent for instance because of a blown fuse. In case each device contains a master, however, no particular precaution is necessary to ensure that there is an active master when one of the phases is absent, since each phase of the three-phase mains supply supplies a number of devices comprising a master, so that there is always an active master even when two of the three phases are absent.

The invention claimed is:

1. A communication network, comprising
a plurality of devices, each device comprising:
   a device operating circuit,
   a communication interface for receiving command signals for controlling an operation of the device operating circuit,
   a control circuit coupled between the device operating circuit and the communication interface for controlling the operation of the device operating circuit in response to said command signals, and
   a master integral to the device for receiving control signals; and
a control unit for generating the control signals,
wherein the communication network activates one of the masters as an active master for generating the command signals in response to the received control signals, and for transferring the command signals to the communication interfaces of the plurality of devices, and in case the active master fails, the communication network activates a second one of the masters as the active master for generating the command signals in response to the received control signals, and for transferring the command signals to the communication interfaces of the plurality of devices.

2. The communication network of claim 1, wherein the control unit is a wireless remote control unit, and the wireless remote control unit wirelessly communicates the control signals to the masters of the devices.

3. The communication network of claim 1, wherein each master is equipped with a transceiver for wireless communication between the control unit and the master and between the master and the communication interfaces of the devices.

4. The communication network of claim 1, wherein in at least one of the devices, the device operating circuit comprises a ballast circuit for operating a lamp.

5. The communication network of claim 4, wherein in the at least one device includes a luminaire.

6. The communication network of claim 1, wherein each master includes
   beacon means for transmitting periodical signals when it is the active master; and
   detecting means for detecting the periodical signals transmitted by the active master.

7. The communication network of claim 6, wherein the detecting means comprise a timer circuit for timing a time lapse during which the periodical signal is absent.

8. The communication network of claim 7, wherein each of the masters includes means for activating itself in case the active master fails.

9. The communication network of claim 8, wherein the means for activating itself operates to activate itself when the time lapse during which the periodical signal is absent is longer than a predetermined time lapse.

10. The communication network of claim 1, wherein each of the masters includes a table stored in memory that relates the received control signals to the command signals.

11. A method of operating a communication network having a plurality of devices, the method comprising:
    activating a first master included in one of the plurality of devices to become an active master;
    receiving control signals at the active master from a control unit;
    in response to the control signals, transmitting command signals from the active master to the plurality devices to control operations of the devices;
    detecting at a second one of the devices when the active master fails;
    in response to detecting that the active master has failed, activating a second master included in the second one of the devices to replace the active master and to respond to the control signals by transmitting the command signals to the plurality devices to control operations of the devices.

12. The method of claim 11, wherein the active master transmits the command signals wirelessly to at least some of the plurality of devices.

13. The method of claim 11, wherein the active master transmits a periodic beacon signal to indicate that it is active and operating.

14. The method of claim 13, wherein detecting at a second one of the devices when the active master fails comprises detecting that the beacon signal is absent for a time period greater than a threshold time period.

15. The method of claim 11, wherein one of the operations of the devices is an illumination operation.

16. The method of claim 11, wherein the control unit is a user-operated remote control unit that generates the control signals, and wherein receiving the control signals at the active master from the control unit comprises receiving the control signals wirelessly from the user-operated remote control unit, where the user-operated remote control unit generates the control signals in response to a user input.

17. The method of claim 11, further comprising:
    detecting at a third one of the devices when the second master fails;
    in response to detecting that the second master has failed, activating a third master included in the third one of the devices to replace the second master and to respond to the control signals by transmitting the command signals to the plurality devices to control operations of the devices.

18. The method of claim 11, further comprising accessing a table stored in memory at the active master to determine the command signals from the received control signals.

19. A network, comprising:
    a plurality of devices, each device comprising:
       a ballast circuit and a lamp connected to the ballast circuit,
       a communication interface for receiving command signals for controlling an operation of the ballast circuit and lamp,
       a control circuit coupled between the ballast circuit and lamp and the communication interface for controlling operations of the ballast circuit and lamp in response to said command signals, and
       a master integral to the device for receiving control signals; and a remote control unit for generating and transmitting the control signals, the remote control unit being remotely located with respect to the plurality of devices,
wherein the communication network activates one of the masters as an active master for receiving the control signals wirelessly from the remote control unit, and in response thereto for generating the command signals, and for communicating the command signals to the communication interfaces of the plurality of devices, and wherein when the active master fails, the communication network activates a second one of the masters as the active master for generating the command signals in response to the received control signals, and for communicating the command signals to the communication interfaces of the plurality of devices.

* * * * *